(12) United States Patent
Beier et al.

(10) Patent No.: US 9,795,914 B2
(45) Date of Patent: Oct. 24, 2017

(54) DEVICE OF AN AIRCRAFT ENGINE FOR SEPARATING OIL FROM AN AIR-OIL VOLUME FLOW

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 293 days.

(21) Appl. No.: 14/692,122

(22) Filed: Apr. 21, 2015

(65) Prior Publication Data

US 2015/0321130 A1     Nov. 12, 2015

(30) Foreign Application Priority Data

May 9, 2014   (DE) ........................ 10 2014 106 583

(51) Int. Cl.
*B01D 47/06* (2006.01)
*B01D 45/12* (2006.01)
(Continued)

(52) U.S. Cl.
CPC ............. *B01D 47/06* (2013.01); *B01D 45/12* (2013.01); *B01D 47/027* (2013.01); *F01D 25/18* (2013.01);
(Continued)

(58) Field of Classification Search
CPC ....... B01D 471/10; F01D 5/187; F01D 25/12; F01D 9/041; F04D 29/321;
(Continued)

(56) References Cited

U.S. PATENT DOCUMENTS

| 3,722,624 | A | | 3/1973 | Buckland |
| 4,037,991 | A | * | 7/1977 | Taylor ..................... F04F 5/466 |
| | | | | 417/179 |

(Continued)

FOREIGN PATENT DOCUMENTS

| DE | 3605619 | 8/1987 |
| DE | 102006058343 | 7/2008 |

(Continued)

OTHER PUBLICATIONS

European Search Report dated Oct. 8, 2015 for related Application No. 15165771.5.

(Continued)

*Primary Examiner* — Duane Smith
*Assistant Examiner* — Minh-Chau Pham
(74) *Attorney, Agent, or Firm* — Shuttleworth & Ingersoll, PLC; Timothy Klima

(57) ABSTRACT

A device of an aircraft engine for separating oil from an air-oil volume flow and an apparatus for introducing oil into the air-oil volume flow. An outlet area of the apparatus for introducing oil is provided in a closed line section, into which the air-oil volume flow can be introduced via an inlet area. In accordance with the invention, a flow cross-section of the line section downstream of the outlet area of the apparatus tapers at least partially like a nozzle and at least in some sections inside a confusor area.

13 Claims, 5 Drawing Sheets

Figure 2:
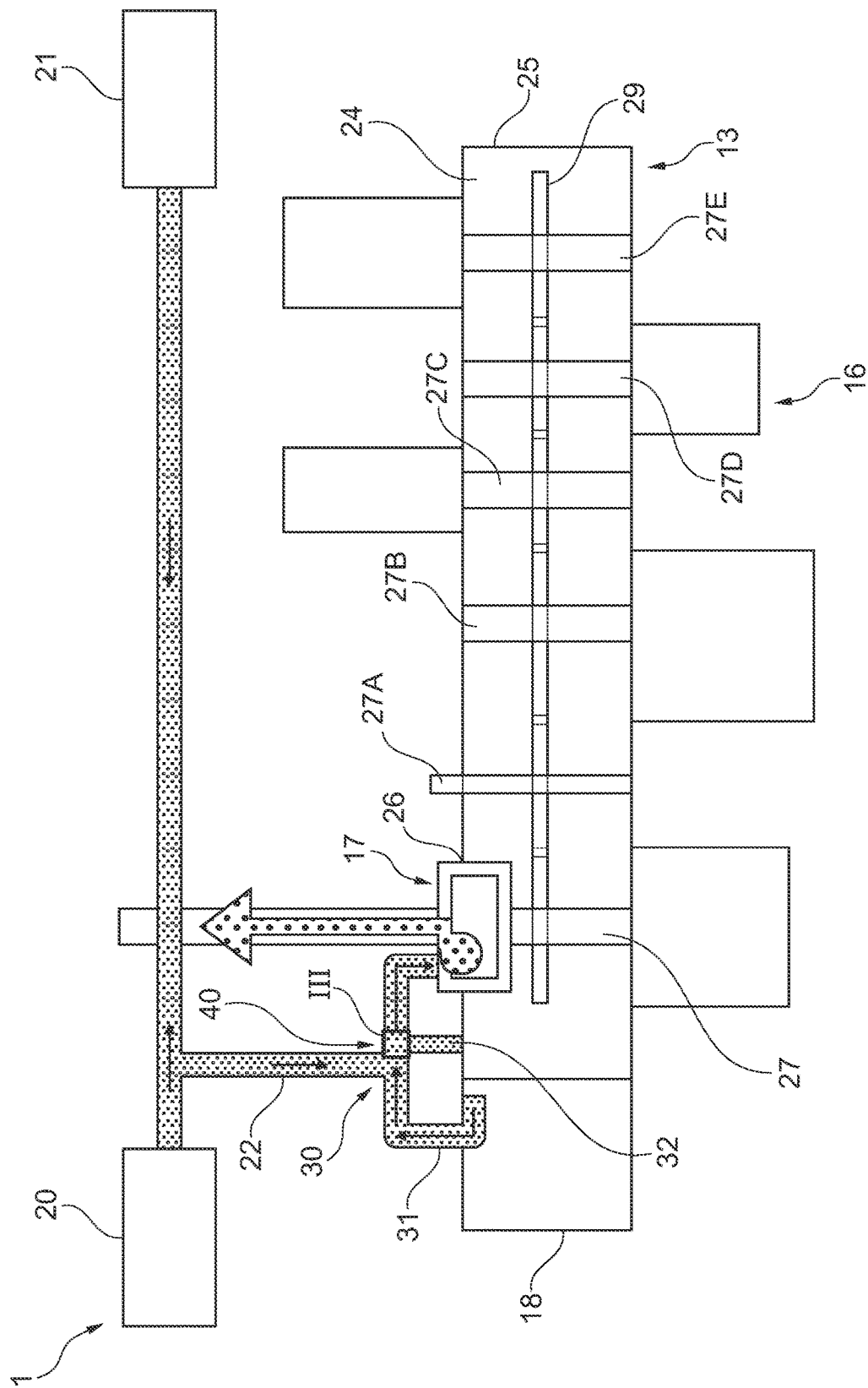

(51) Int. Cl.
*F01D 25/18* (2006.01)
*F02C 7/06* (2006.01)
*B01D 47/02* (2006.01)

(52) U.S. Cl.
CPC .......... *F02C 7/06* (2013.01); *B01D 2247/101* (2013.01); *Y02T 50/671* (2013.01)

(58) Field of Classification Search
CPC ........... F05D 2220/32; F05D 2240/127; F05D 2240/12; F05D 2240/30; F05D 2260/202
USPC ............ 55/385.1, 306; 95/216, 219; 96/282, 96/284, 323, 268, 270, 275, 281; 261/DIG. 54
See application file for complete search history.

(56) References Cited

U.S. PATENT DOCUMENTS

| | | | |
|---|---|---|---|
| 4,198,218 A | 4/1980 | Erickson | |
| 4,755,103 A | 7/1988 | Streifinger | |
| 4,947,963 A | 8/1990 | Aho | |
| 5,037,585 A * | 8/1991 | Alix | B64D 13/00 261/116 |
| 5,202,525 A * | 4/1993 | Coffinberry | F02K 7/10 60/218 |
| 5,413,626 A | 5/1995 | Bartsch | |
| 5,444,982 A * | 8/1995 | Heberling | F23D 11/36 60/737 |
| 5,450,835 A | 9/1995 | Wagner | |
| 6,391,100 B1 | 5/2002 | Hogan | |
| 6,485,548 B1 * | 11/2002 | Hogan | B01D 45/12 261/DIG. 54 |
| 2009/0183950 A1 | 7/2009 | Brouillet et al. | |
| 2016/0201475 A1 * | 7/2016 | Moore | F01D 5/186 415/115 |

FOREIGN PATENT DOCUMENTS

| | | |
|---|---|---|
| EP | 0836005 A1 | 4/1998 |
| FR | 903942 A | 10/1945 |

OTHER PUBLICATIONS

German Search Report dated Jan. 27, 2015 from counterpart application No. 10 2014 106 583.2.

* cited by examiner

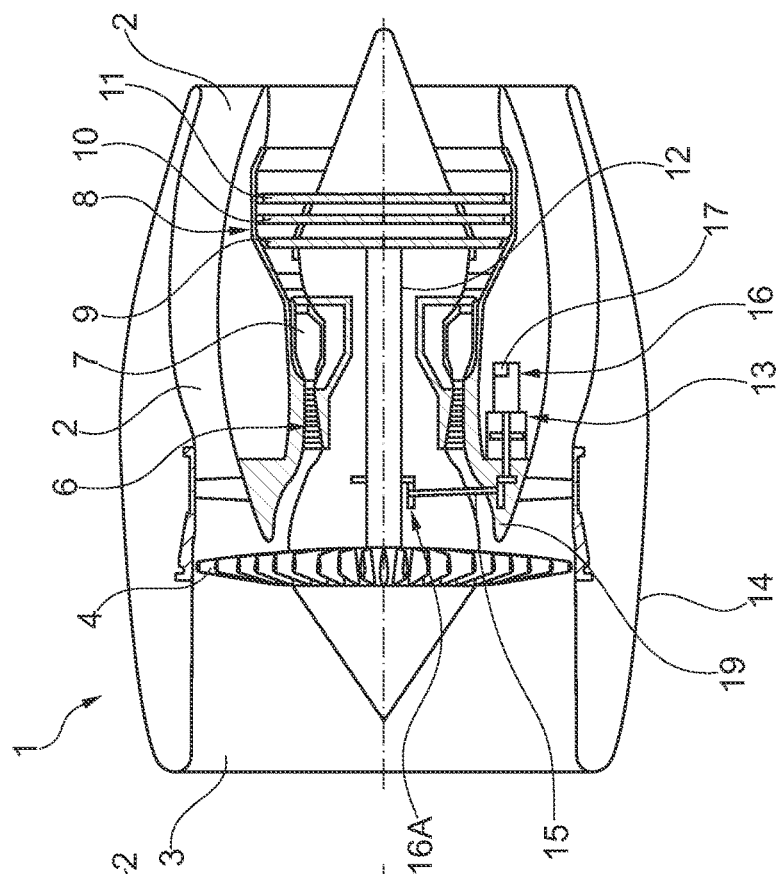
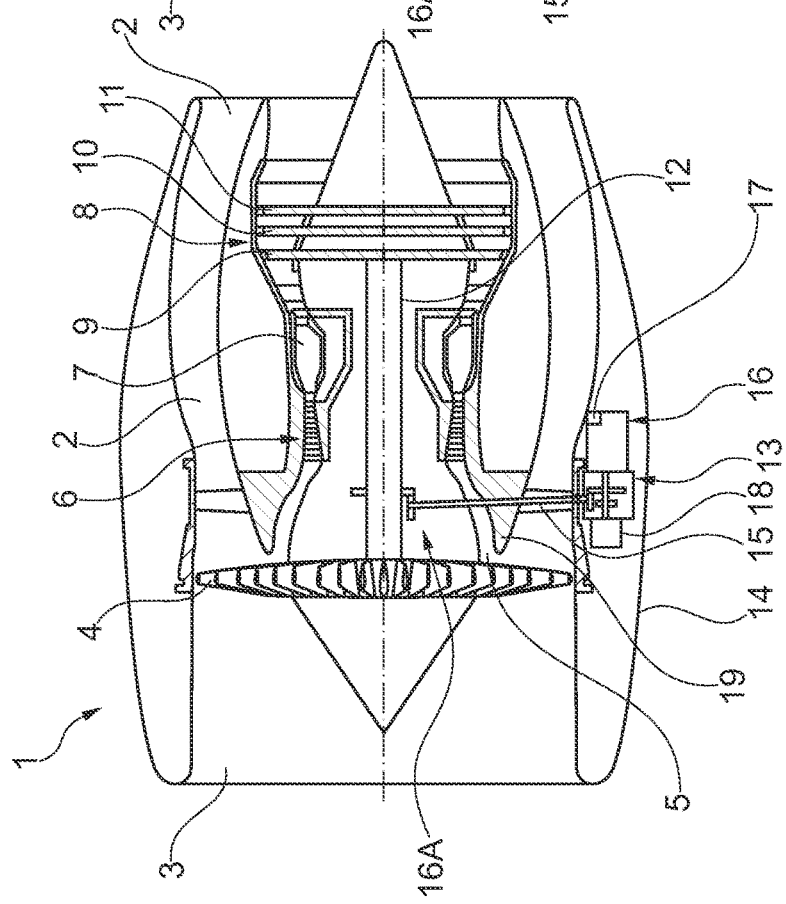

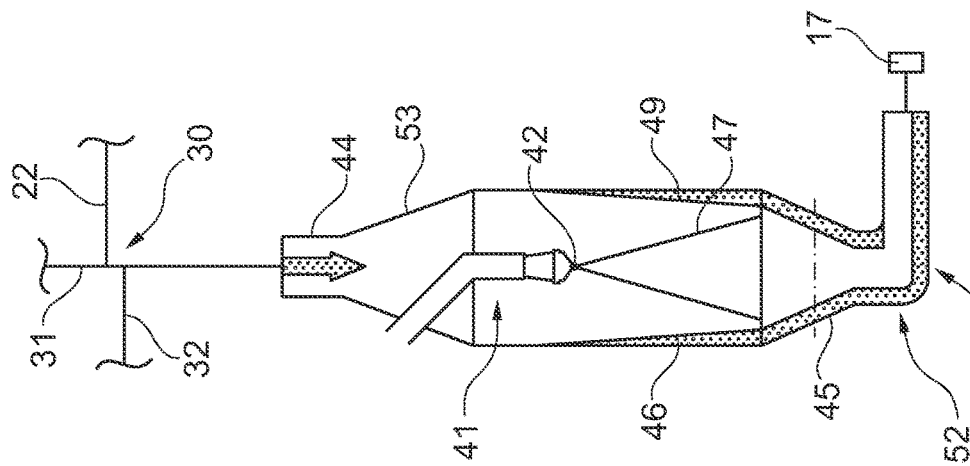
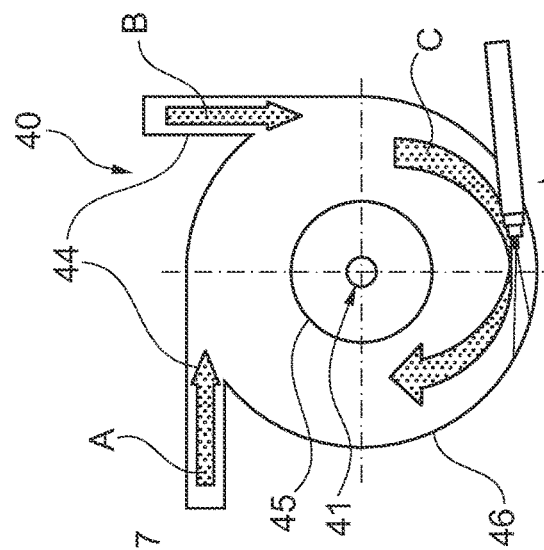
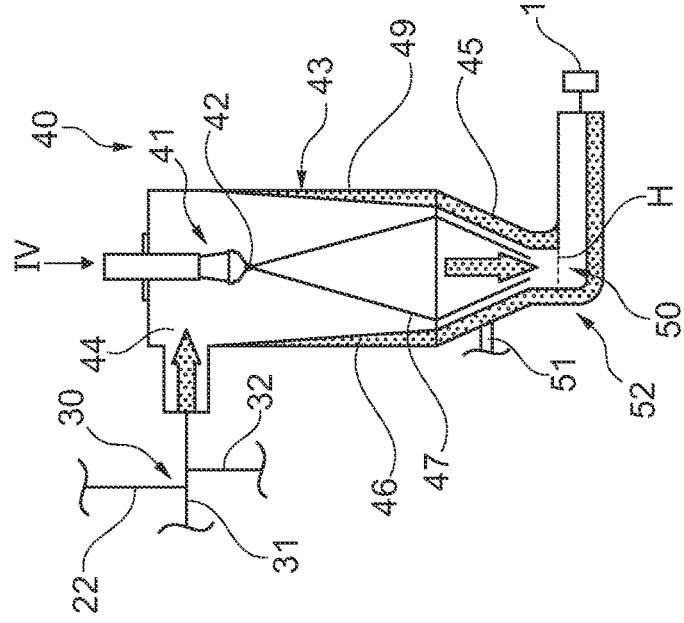

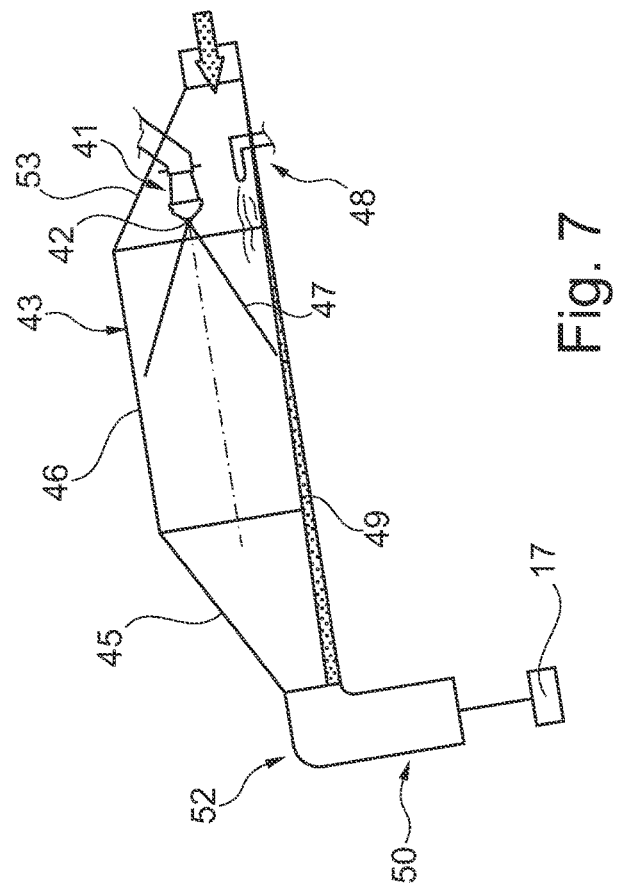
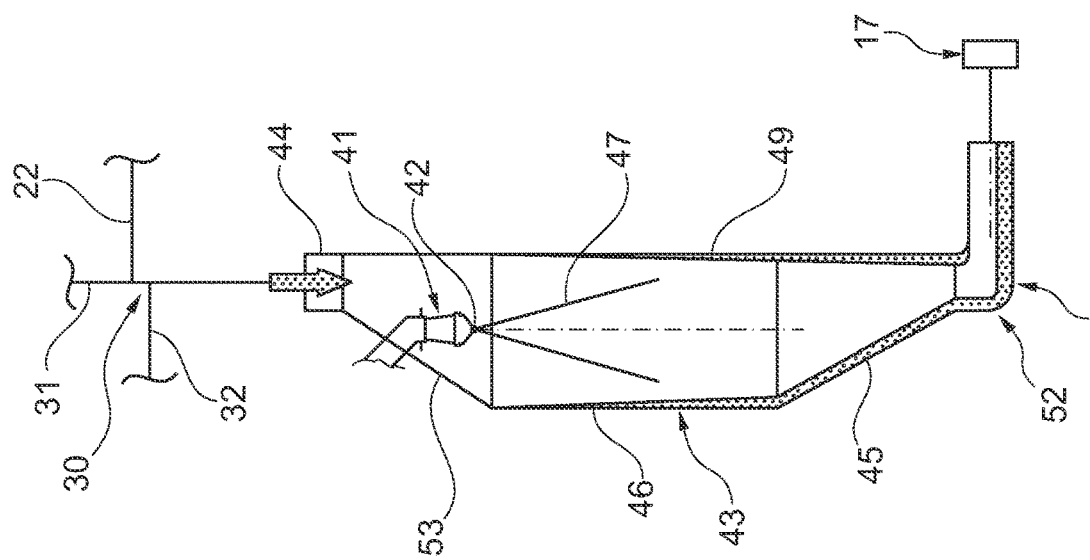

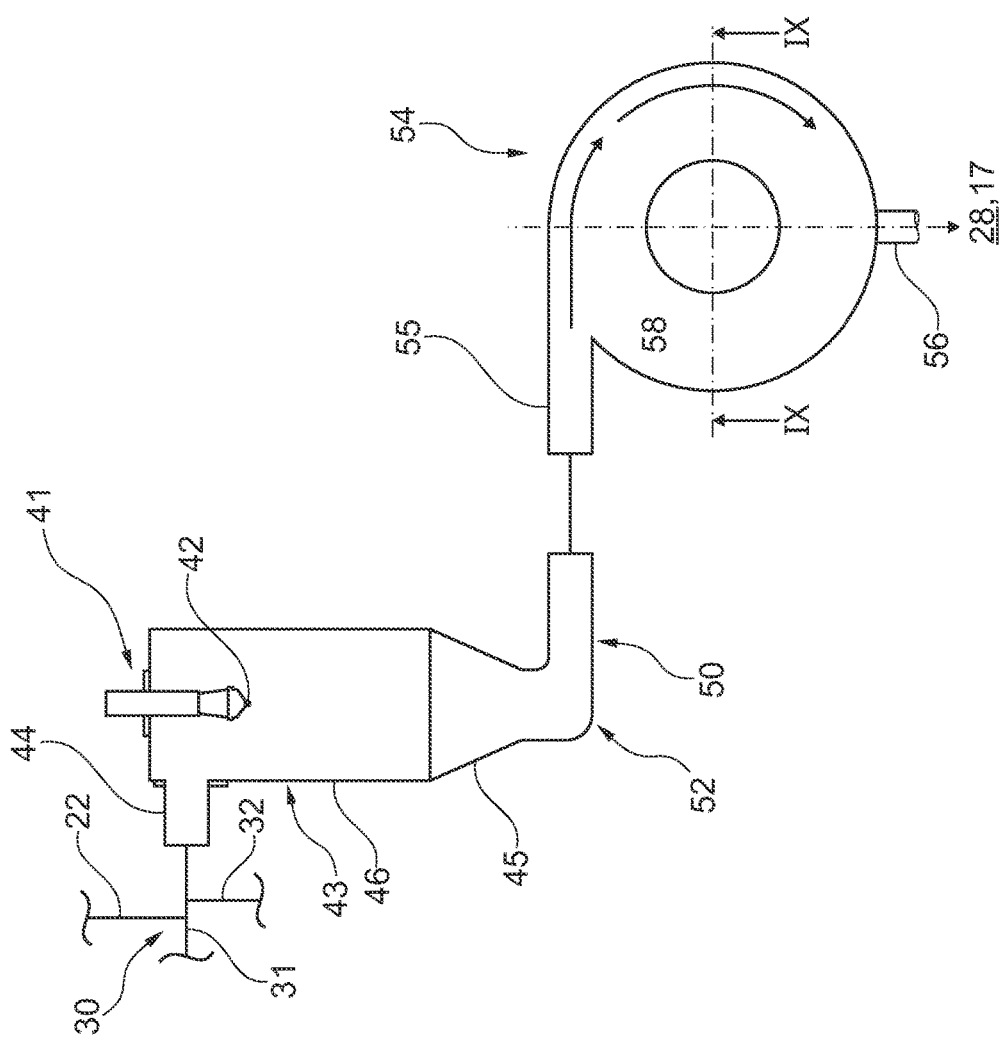
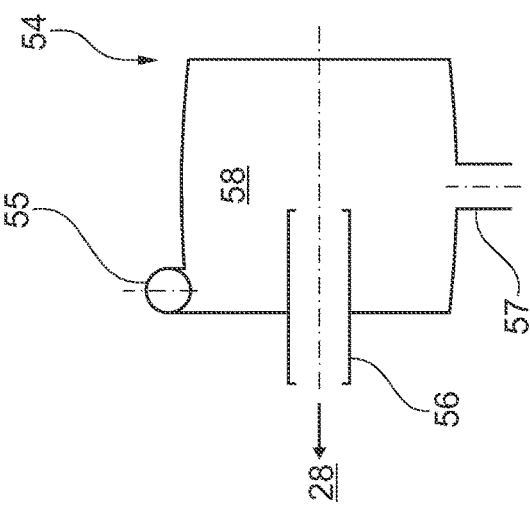
Fig. 8
Fig. 9

DEVICE OF AN AIRCRAFT ENGINE FOR SEPARATING OIL FROM AN AIR-OIL VOLUME FLOW

This application claims priority to German Patent Application No. DE102014106583.2 filed May 9, 2014, the entirety of which is incorporated by reference herein.

This invention relates to a device of an aircraft engine for separating oil from an air-oil volume flow, in accordance with the type defined in more detail in the present disclosure.

From the unpublished specification DE 10 2013 112 771.1 of the applicant, a jet engine is known, with an apparatus for spraying oil into an air-oil volume flow guided inside a flow cross-section limited by a wall area, said air-oil volume flow being guidable through an oil separator in order to separate the oil. The oil can be sprayed into the air-oil volume flow in the area of the apparatus via an outlet area firmly connected to the wall area, so that existing jet engine systems too can be designed with little effort with an apparatus for spraying in oil.

The object underlying the present invention is to further improve a separation capacity of a device of this type.

It is a particular object to provide a solution to the above problems by a device having features as disclosed herein.

The device of an aircraft engine in accordance with the invention for separating oil from an air-oil volume flow is provided with an apparatus for introducing oil into the air-oil volume flow. An outlet area of the apparatus for introducing oil is provided in a closed line section, into which the air-oil volume flow can be introduced via an inlet area.

In accordance with the invention, a flow cross-section of the line section downstream of the outlet area of the apparatus tapers at least partially like a nozzle and at least in some sections inside a confusor area.

Since the air-oil volume flow supplied with oil via the outlet area of the apparatus is accelerated in the confusor area, droplets of the air-oil volume flow with a droplet size of preferably less than 1 μm also combine with the introduced oil to form larger droplets. These larger oil droplets already separate at a wall area limiting the confusor area, allowing an oil content of the air-oil volume flow to be reduced to the required extent.

In the present invention, the term confusor area is understood as the opposite of a diffusor area. In a confusor area, the flow cross-section of a line section tapers at least in some sections, thus increasing the flow velocity of the fluid, which can be liquid or gaseous, flowing through the confusor area. By contrast, the flow cross-section widens in the diffusor area and the fluid flowing through it is decelerated. Generally speaking, a confusor area has a continuous cross-sectional constriction with a constant constriction angle. In principle, confusor areas can also have cross-sectional constrictions with a variable constriction angle. In confusor areas, the jet separation is substantially lower than with sudden cross-sectional constrictions, which is why resistance coefficients of confusor areas too are considerably lower. Generally speaking, conically designed intakes or also nozzles of a line section, in the area of which the flow cross-section of a line section decreases in the flow direction of a fluid, while at the same time the velocity of the fluid flowing through the confusor area increases, can be subsumed under the term 'confusor' or 'confusor area'.

The oil load of an air-oil volume flow issuing in the direction of an environment can be reduced to the required extent by means of the combination of the apparatus for introducing oil into the air-oil volume flow and the design of the flow cross-section. The apparatus is configured in such a way that oil droplets are created in the air-oil volume flow by introducing oil into said flow that are mainly larger than oil droplets which due to their small size cannot be separated, or if so only with great effort.

The required setting of the largest possible drop diameters in the air-oil volume flow by introducing oil in the line section is favoured in an advantageous embodiment of the device in accordance with the present invention in that a flow cross-section of an intermediate area of the closed line section, which extends at least between the outlet area of the apparatus and the confusor area, is designed at least approximately constant and/or widening at least approximately diffusor-like at least in some sections in order to prevent a positive acceleration of the air-oil volume flow in the introduction area. This design of the intermediate area of the closed line section has a calming effect on the flow which favours the coalescence of small droplets of the air-oil volume flow with the introduced oil to form larger droplets, thereby improving a separation capacity of oil out of an air-oil volume flow with little effort.

If the line section upstream of the outlet area of the apparatus has a diffusor area, in the zone of which the flow cross-section of the line section is designed widening at least approximately diffusor-like at least in some sections, an at least approximately laminar flow is formed in the intermediate area of the closed line section, which generates only low pressure losses in the line section and favours or improves the coalescence of small oil droplets with the introduced oil.

If a deflection area of the line section, which has a bend of preferably 90° and is designed with a separate oil outlet or with a combined air-oil outlet of the line section, adjoins the confusor area, the oil borne along in the air-oil volume flow is separated to the required extent by a simple design due to its higher inertia in the area of the bend, and an oil content of the air-oil volume flow is reduced.

In a further advantageous embodiment of the device in accordance with the invention, the line section is connected to a cyclone, in the area of which oil from an air-oil volume flow to be introduced into or passed out of the line section can be shut off mechanically. In the area of the cyclone or of the centrifugal separator, the air as the carrier of the oil is set into a rotary motion by its own flow velocity and by an appropriate design of the cyclone. The centrifugal forces acting on the oil droplets accelerate the oil droplets in the cyclone radially outwards, and they are separated upon impact with a limiting wall or with a casing wall of the cyclone. The oil droplets are thus separated from the airflow, which is routed inwards and discharged.

If an oil separator or breather is provided downstream of the line section, the oil load of the air-oil volume flow can be further reduced. In the present invention, an oil separator or a breather is understood to be a centrifugal oil separator having a deflection area which acts as a centrifuge. In the area of a breather of this type, oil particles with smaller diameters are collected by a metal foam arranged in the oil separator and filtered out of the air. The oil separated by this filtering process is returned to an oil circuit. The cleaned air is preferably discharged to the environment of an aircraft engine.

Depending on the respective application, an inlet of the cyclone for the air-oil volume flow is connected to an air outlet of the line section or to an air outlet of that area of an engine supplied with oil, where an air outlet of the cyclone can be connected to the inlet area of the line section, to the air-inlet of a breather or to an environment of the engine.

If the cyclone has separate air and oil outlets, where the oil outlet of the cyclone in its installation position is provided in a lower area of the cyclone, while air can be removed via the air outlet from a center area of an interior of the cyclone out of the latter, an oil load of an air-oil volume flow in the area of a cyclone can be reduced with little effort.

An air-oil volume flow can be introduced into the cyclone via the air inlet and tangentially to a wall area of the cyclone, in order to allow the separation of oil droplets borne along in the air-oil volume flow out of said air-oil volume flow with a high separation capacity.

Preferably, the cyclone includes substantially an intake cylinder, a cone, an oil collecting container and an immersion pipe which is for example fitted in the intake cylinder centrally and from above in the installation position of the cyclone. Inside the intake cylinder, the air-oil volume mixture is set on a circular path by blowing in the air-oil volume flow tangentially. The tapering of the cone adjoining the intake cylinder increases the rotational speed of the air-oil volume flow to such an extent that the oil droplets are hurled by centrifugal force against the cone walls and hence decelerated. The oil droplets are separated from the flow and flow downwards into the collecting container. The cleaned air is removed from the cone upwards by the central immersion pipe or laterally out of the cyclone.

In a further advantageous embodiment of the device in accordance with the invention, an outlet area for oil is provided in the interior of the cyclone, where oil is introduced into an interior of the cyclone tangentially to the wall area of the cyclone and substantially perpendicular to a vertical axis of the cyclone in an area close to the wall, in order to generate in the inner wall area an oil film improving a separation capacity of the cyclone and an oil flow inside the oil film facing in the direction of the outlet area for oil of the cyclone, said oil flow in turn improving a separation capacity of the cyclone.

If the oil can be introduced into the line section via the outlet area of the apparatus at least approximately centrally, the air-oil volume flow is supplied as evenly as possible with oil over the entire flow cross-section of the air-oil volume flow.

If the oil is introduced into the line section via the outlet area of the apparatus in the form of a spray cone or as a cone-shaped oil film, a required even supply of oil to the air-oil volume flow is achieved.

The opening angle of the spray cone or of the cone-shaped oil film is, in a further embodiment of the device in accordance with the invention, settable using the outlet area of the apparatus in such a way that the oil introduced in conical form impacts in a wall area of the confusor area, said wall area facing the outlet area of the apparatus, so that an oil film and an oil film flow in the direction of an oil outlet of the line section are generated in turn in the confusor area to improve a separation capacity of the device with little effort.

If the air-oil volume flow can be introduced into the line section via an inlet area upstream of the outlet area of the apparatus, the flow cross-section of said line section being smaller than the flow cross-section of the line section upstream of the outlet area of the apparatus, the flow velocity of the air-oil volume flow in the line section upstream of the outlet area of the apparatus is reduced, a coalescence of oil droplets in the air-oil volume flow with oil introduced into the line section via the outlet area of the apparatus to form oil droplets with larger diameters is favoured, and a separation capacity of the device is improved with little effort.

If the air-oil volume flow is introduced into the line section via the inlet area tangentially to the wall area of the line section and substantially perpendicular to the introduction direction of the oil, oil droplets borne along by the air-oil volume flow are, due to centrifugal forces, already separated upstream of the outlet area of the apparatus at the wall area of the line section. The oil droplets not yet separated due to their diameters are supplied with the introduced oil downstream of the outlet area of the apparatus and combine with the introduced oil to form larger oil droplets that can subsequently be separated with little effort from the air-oil volume flow, so that in turn an improved separation capacity is achieved.

If a further oil introduction means is provided in an area of the line section close to the wall and preferably upstream of the outlet area of the apparatus, in order to generate in the wall area of the line section an oil film and a flow in the oil film in the direction of the oil outlet of the line section, the separation capacity of the device is in turn improved with little effort.

The cyclone can, depending on the oil load of the air-oil volume flow and also depending on the design of the line section and of the apparatus for introducing oil, be arranged downstream or upstream of the line section, where a breather optionally arrangeable in the flow path of the air-oil volume flow can in turn be positioned upstream or downstream of the cyclone arranged downstream of the line section.

The line section is, in a cost-effectively producible embodiment of the device in accordance with the invention, designed at least in its intermediate area at least approximately tubular or hollow-cylindrical.

The diffusor area and/or the confusor area can be designed symmetrical or also asymmetrical, where the asymmetrical design of the diffusor area and/or of the confusor area is provided preferably in an at least approximately horizontal installation position of the line section in order to achieve over the level of the flow cross-section in the line section a droplet size distribution which sets as a result of the flow, which in turn improves a separation capacity of the device. This embodiment is based on the knowledge that with an at least approximately horizontal installation position of the line section, droplets with a smaller diameter are borne along by the flow in an upper area of the flow cross-section due to their lower weight, while larger droplets tend to flow through the line section in the lower flow cross-section of said line section in the main flow direction of the air-oil volume flow, and separate in the lower wall area of the line section when they come into contact with the wall area. The smaller droplets of the air-oil volume flow combine with the oil introduced into the line section via the outlet area of the apparatus to form larger oil droplets which can then be readily separated from the air-oil volume flow downstream of the outlet area of the apparatus.

The outlet area can for example be designed as a spray nozzle to introduce a cone-shaped oil spray into the line section. The oil spray consists of droplets whose defined diameters favour a coalescence with oil droplets in the air-oil volume flow.

Generally speaking, the oil load of the air-oil volume flow matches, regardless of the installation position of the device prior to introducing the oil flow into the line section, a first level that preferably approximately corresponds to the oil load of the air-oil volume flow when it leaves an area of an aircraft engine supplied with oil, such as a bearing chamber, an oil tank or an interior of an accessory gearbox casing. After introduction of the oil via the outlet area of the apparatus in the line section, the oil load of the air-oil volume flow is at a second level, which is higher than the first level. At the end of the confusor area, the air-oil volume flow has an oil load which corresponds to a third level and is lower than the first load level. During the flow through the deflection area of the line section optionally following the confusor area, the oil load drops from the third level to a fourth level which is lower than the third level.

The first level of the oil load of the air-oil volume flow can be reduced before introduction of the air-oil volume flow into the line section by a cyclone arranged upstream of the line section. Additionally or alternatively, the fourth level of the oil load of the air-oil volume flow can be further lowered by a cyclone arranged downstream of the deflection area, where the cyclone can also be provided, in a design of the line section without deflection area, directly downstream of the confusor area, where the third level of the oil load can then be lowered using the cyclone.

Furthermore, the third or fourth level of the oil load of the air-oil volume flow can be set to a required extent by a cyclone arranged downstream of the confusor area or the deflection area and by a breather arranged in turn downstream of the cyclone.

Further advantages and advantageous embodiments of the device in accordance with the invention become apparent from the patent Claims and the exemplary embodiments described in principle in the following with reference to the accompanying drawing, where in the description of the various exemplary embodiments the same reference numerals are used for components of identical design and function for greater clarity.

In the drawing,

FIG. 1a shows a highly schematized longitudinal sectional view of an aircraft engine with an accessory gearbox arranged in the fan casing, FIG. 1b shows a representation—corresponding to FIG. 1a—of an aircraft engine with an accessory gearbox mounted in the area of the engine core, FIG. 2 shows a highly schematized partial representation of the aircraft engine according to FIG. 1a or FIG. 1b with an oil separator arranged in the area of the accessory gearbox, FIG. 3 shows an enlarged representation of an area III shown in more detail in FIG. 2, FIG. 4 shows the area illustrated in FIG. 3 from a view IV shown in more detail in FIG. 3, FIG. 5 shows a representation—corresponding to FIG. 3—of a second embodiment of the device in accordance with the present invention, FIG. 6 shows a representation—corresponding to FIG. 3—of a third embodiment of the device in accordance with the present invention, FIG. 7 shows a representation—corresponding to FIG. 3—of a fourth embodiment of the device in accordance with the present invention, FIG. 8 shows a schematized top view onto a cyclone which in the present case is arranged downstream of a line section of the device in accordance with FIG. 3, and FIG. 9 shows a sectional view of the cyclone shown in FIG. 8 along a sectional line IX-IX shown in more detail in FIG. 8.

FIGS. 1a and 1b each show an aircraft engine or a jet engine 1 in a longitudinal sectional view. The aircraft engine 1 is provided with a bypass duct 2 and an intake area 3, where a fan 4 adjoins downstream the intake area 3 in a manner known per se. Again downstream of the fan 4, the fluid flow in the aircraft engine 1 splits into a bypass flow and a core flow, with the bypass flow flowing through the bypass duct 2 and the core flow into an engine core 5 which is in turn designed in a manner known per se with a compressor device 6, a burner 7 and a turbine device 8.

The turbine device 8 has in the present invention three rotor devices 9, 10 and 11, which have a substantially comparable design and are connected to an engine axis 12.

In the design of the aircraft engine 1 according to FIG. 1a, an accessory gearbox 13 is arranged in an outer engine casing 14, delimiting the bypass duct 2 and representing the outer circumferential area of the jet engine 1. The accessory gearbox 13 in the present invention is connected via a drive shaft 15 running in the radial direction of the jet engine 1 and via an inner gearbox 16A to the engine axis 12 and is thus driven/subjected to torque by the engine axis 12 during operation of the jet engine 1. Various auxiliary units 16 and an oil separator 17, which is also referred to as breather, are subjected to torque to the required extent by the accessory gearbox 13. Additionally, an oil tank 18 is provided in the area of the accessory gearbox 13, which represents a hydraulic fluid reservoir, from which oil is tapped for cooling and lubricating various areas of the aircraft engine 1 such as bearing devices, gear pairings of the inner gearbox 16A and of the accessory gearbox 13, and further assemblies of the aircraft engine 1 that are to be cooled and lubricated.

In contrast to this, the accessory gearbox 13 with the auxiliary units 16 and the oil separator 17 is arranged, in the design of the aircraft engine 1 according to FIG. 1b, in the radial direction between the bypass duct 2 and the engine core 5 in a component 19 delimiting both the bypass duct 2 and the engine core 5.

FIG. 2 shows an embodiment of the aircraft engine 1 according to FIG. 1a in a highly schematized form in the area of the accessory gearbox 13, the auxiliary units 16 and the oil separator 17, the latter being in the present invention connected to the oil tank 18 and two further areas 20, 21 as well as to an interior 24 of a casing 25 of the accessory gearbox 13, all of which representing areas of the aircraft engine 1 supplied with oil. The areas 20, 21 here represent the bearing chambers of the aircraft engine 1 and are supplied during operation of the aircraft engine 1 with oil from the oil tank 18 for lubrication and cooling. The area 20 here represents the bearing chamber of the front bearing and the area 21 the bearing chamber of the rear bearing of the aircraft engine 1. The aircraft engine 1 according to FIG. 1b shows the aspects described in more detail in the following with reference to FIG. 2 and to FIGS. 3-9 to a substantially identical extent.

In the embodiment of the aircraft engine 1 shown in FIG. 2, air-oil volume flows from the front bearing chamber 20 and from the rear bearing chamber 21 can each be guided in the direction of a line section 22. The enriched air-oil volume flows in the area of the bearing chambers 20 and 21 as well as in the area of the oil tank 18 and of the accessory gearbox 13 are routed—downstream of a line section node 30, into the area of which issue the line section 22 and a further line section 31 connected to the oil tank 18 as well as a line section 32 coupled to the accessory gearbox 13—in the direction of a device 40 provided in an area III shown in more detail.

Generally speaking, it is also possible to route only one air-oil volume flow of the bearing chambers 20 and 21, of the oil tank 18 or of the accessory gearbox 13 in the direction of the device 40 and to clean it there in the manner described in detail in the following.

FIG. 3 shows a first exemplary embodiment of the device 40 of the aircraft engine 1 provided for separating oil from the air-oil volume flows downstream of the line section node 30. The device 40 includes an apparatus 41 for introducing oil into the air-oil volume flow downstream of the line section node 30. An outlet area 42 of the apparatus 41 for introducing oil is provided in a closed line section 43, into which the air-oil volume flow can be introduced via an inlet area 44. A flow cross-section of the line section 43 tapers like a nozzle downstream of the outlet area 42 of the apparatus 41 in a confusor area 45 of the closed line section 43, so that the air-oil volume flow routed in the closed line section is accelerated in the confusor area 45. A flow cross-section of an intermediate area 46 of the closed line section 43 provided upstream of the confusor area 45 and extending at least between the outlet area 42 of the apparatus 41 and the confusor area 45, is designed at least approximately constant to prevent a positive acceleration of the air-oil volume flow, and can in further embodiments of the device 1 also widen at least approximately diffusor-like at least in some sections.

The air-oil volume flow is introduced into the closed line section 43 via the inlet area 44 and in the manner indicated in FIG. 4 by the arrows A, B and C tangentially to the wall area of the closed line section 43 or of the intermediate area 46 and substantially perpendicular to the introduction direction of the oil, so that the air-oil volume flow starting from the inlet area 44 flows initially helically in the intermediate area 46 in the direction of the confusor area 45 through the intermediate area 46.

The oil is introduced via the outlet area 42 of the apparatus 41 at least approximately centrally into the closed line section 43 or its intermediate area 46 in the form of a spray cone 47 or as a cone-shaped oil film. The opening angle of the spray cone 47 or of the cone-shaped oil film can be set using the outlet area 42 such that the oil introduced in conical form impacts in a wall area of the confusor area 45, said wall area facing the outlet area 42 of the apparatus 41. The flow cross-section of the inlet area 44, via which the air-oil volume flow can be introduced into the line section 43 upstream of the outlet area 42 of the apparatus 41, is smaller than the flow cross-section of the closed line section 43 upstream of the outlet area 42 of the apparatus 41.

In addition, in this embodiment of the device 40 a further optional oil introduction means 48 is provided in an area of the line section 43 close to the wall area upstream of the outlet area 42 of the apparatus 41, in order to create in the wall area of the line section 43 an oil film 49 and a flow in the oil film starting from the inlet area 44 in the direction of an oil outlet 50 of the closed line section 43, in the area of which oil droplets borne along by the air-oil volume flow are separated with high efficiency and a separation capacity of the device 40 is improved.

In addition, air flowing into the closed line section 43 via the inlet area 44 is also discharged via the oil outlet 50 out of said closed line section 43, so that the oil outlet 50 represents a combined air-oil outlet.

Alternatively, it is also possible here that only oil is discharged via the oil outlet 50 from the closed line section 43, while the air can be removed via a separate air outlet 51 from the closed line section 43, with the oil then having the level H indicated in FIG. 3 in the area of the oil outlet 50.

Downstream of the confusor area 45, the closed line section 43 includes a deflection area 52, which has in the present invention a bend of 90° and in whose area the oil outlet 50 and the air outlet 51 are respectively provided. In further embodiments the deflection can also be designed with a bend of more or less than 90°. The deflection area 52 acts as an impingement filter, and oil borne along in the air-oil volume flow is separated mechanically there, thus further improving a separation capacity of the device 40 in turn.

The oil particles or oil droplets in the air-oil volume flow downstream of the outlet area 42 of the apparatus 41 now enlarged by washing out the oil can be separated substantially more efficiently by introducing oil in the confusor area 45 and in the deflection area 52, so that oil losses of the aircraft engine 1 in the direction of an environment 28 of the jet engine 1 are minimized by the reduced emissions.

FIG. 5 shows a representation—corresponding to FIG. 3—of a second embodiment of the device 40, where the air-oil volume flow downstream of the line section node 30 is introduced substantially in the axial direction of the closed line section 43. Unlike the embodiment of the device 40 according to FIG. 3, the device 40 according to FIG. 5 includes, upstream of the outlet area 42 of the apparatus 41 and of the intermediate area 46, a diffusor area 53 in the zone of which the flow cross-section of the closed line section 43 is designed widening diffusor-like to reduce a flow velocity of the air-oil volume flow and to generate in the intermediate area 46 a flow calmed as much as possible, preferably a laminar flow, which favours the joining or coalescence of small droplets of the air-oil volume flow with the oil introduced via the apparatus 41 inside the intermediate area 46. The coalescence of the oil droplets of the air-oil volume flow and of the introduced oil is favoured by the respectively applying forces of attraction between the individual oil droplets, where the tendency of the oil droplets to combine into larger oil droplets grows as the ratio between the diameters of the oil droplets increases.

FIG. 6 shows a third embodiment of the device 40, which except for an asymmetrical design of the diffusor area 53 and of the confusor area 45 substantially matches the embodiment of the device 40 according to FIG. 5. In the embodiment of the device 40 according to FIG. 6, both the inlet area 44 of the closed line section 43 and the outlet area 50 in the deflection area 53 are arranged non-concentrically relative to the outlet area 42 of the apparatus 41, where the oil is introduced centrally via the outlet area 42 of the apparatus 41 into the intermediate area 46 in the form of the spray cone 47 or of the cone-shaped oil film. An oil film 49 which flows in the direction of the oil outlet 50 is in turn formed in the wall area of the closed line section 43 and improves the separation capacity of the device 40.

The device 40 can be fitted both vertically in the manner shown in FIG. 6 and at least approximately horizontally to the extent shown in FIG. 7, in order to separate oil from the air-oil volume flow, where in the embodiment of the device 40 according to FIG. 7 the further oil introduction means 48 is provided in the lower wall area of the closed line section 43 in order to create there the oil film 49 for increasing the separation capacity of the device 40, and a flow in said oil film 49 in the direction of the oil outlet 50.

With the substantially horizontal alignment of the device 40, a defined oil droplet diameter distribution is formed over the flow cross-section of the intermediate area 46 of the closed line section 43 and is favoured by the gravity effect acting on the oil droplets borne along in the air-oil volume flow. The gravity effect acting on the oil droplets leads to larger oil droplets increasingly collecting in the lower area of the flow area, while in the upper area of the flow area oil droplets with a smaller droplet diameter are borne along by the air-oil volume flow in the direction of the confusor area 45. With an increasing flow path of the air-oil volume flow in the intermediate area 46, the larger oil droplets separate in the lower wall area of the closed line section 43 in the area of the oil film 49, while the smaller oil droplets in the upper flow cross-section of the intermediate area 46 combine with the oil introduced via the apparatus 41 to form larger oil droplets, which are separated to a substantial extent mechanically at the latest in the confusor area 45 and in the deflection area 52 adjoining said confusor area 45.

To permit further cleaning of the air flowing out of the closed line section 43, which still has a defined load—which is however lower than the load in the air-oil volume flow—and which is introduced into the closed line section 43 via the inlet area 44, it is provided in a further embodiment of the device 40 shown in FIG. 8 and FIG. 9 that the air-oil volume flow removed from the further line section 43 is introduced via an air inlet 55 into a cyclone 54 tangentially to a wall area of said cyclone 54. Alternatively, it can also be provided that the cyclone 54 is arranged upstream of the inlet area 44 of the closed line section 43 and a load in the air-oil volume flow downstream of the line section node 30 is reduced initially in the area of the cyclone 54, and then the pre-cleaned air-oil volume flow is routed via an air outlet 56 of the cyclone 54 in the direction of the inlet area 44 of the closed line section 43.

The cyclone 54 has a separate air and oil outlet, where an oil outlet 57 of the cyclone 54 is provided in the installation position of the cyclone 54 in a lower area of said cyclone 54, while air can be removed from the cyclone 54 via the air outlet 56 from a center area of an interior 58 of said cyclone 54.

The air outlet 56 of the cyclone 54 is coupled, like the combined air-oil outlet 50 or the separate air outlet 51 of the device 40 according to FIGS. 3-7, to the oil separator 17, so that an air-oil volume flow discharged out of the cyclone 54 via the air outlet 56 and laden with oil is introduced into the oil separator 17. The oil separated in each case from the air-oil volume flow oil in the area of the devices 40 according to FIGS. 3-9 is, depending on the respective application, either returned immediately into an oil circuit of the aircraft engine 1 or initially conveyed further in the direction of the oil separator 17 and returned there to the oil circuit.

A porous area 26 is rotatably arranged in the interior of the oil separator 17 and can be flowed through by the air-oil volume flow exiting the cyclone 54. The porous area 26 can in the present invention and to the extent shown in FIG. 2 be driven by the accessory gearbox 13 via a gear 27 and acts as a centrifuge in order to reduce as far as possible the proportion of oil in the air-oil volume flow flowing through the porous area 26. The proportion of oil of the air-oil volume flow in the oil separator 17 is here reduced in the zone of the porous area 26 by separation of the oil from the air, on the one hand as when flowing through an impingement filter and on the other hand as in the area of a centrifuge, due to the rotation of the porous area 26. The oil filtered out of the air-oil volume flow in the zone of the porous area 26 is extracted in the outer area of the oil separator 17, in a manner not shown in detail, via a pump device and returned to the oil tank 18. The air flowing out of the oil separator 17 in the direction of the environment 28 has only a low oil load. The gear 27 is, in addition to further gears 27A to 27E, non-rotatably connected to a gear shaft 29 and arranged in the interior 24 of the accessory gearbox 13.

LIST OF REFERENCE NUMERALS

1 Aircraft engine, jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Auxiliary units
17 Oil separator
18 Oil tank
20 Area, front bearing chamber
21 Area, rear bearing chamber
22 Line section
24 Interior
25 Casing
26 Porous area
27 Gear
27A to 27E Gear
28 Environment
29 Gear shaft
30 Line section node
31 Line section
32 Line section
40 Device
41 Apparatus
42 Outlet area of apparatus
43 Closed line section
44 Inlet area of closed line section
45 Confusor area
46 Intermediate area
47 Spray cone
48 Further oil introduction means
49 Oil film
50 Oil outlet, combined air-oil outlet
51 Air outlet
52 Deflection area
53 Diffusor area
54 Cyclone
55 Air inlet
56 Air outlet
57 Oil outlet
58 Interior of cyclone
A to C Arrow
H Oil level

The invention claimed is:

1. A device of an aircraft engine for separating oil from an air-oil volume flow of the aircraft engine, comprising:
   a closed line section including an inlet area for introducing the air-oil volume flow into the closed line section;
   an apparatus for introducing oil into the air-oil volume flow in the closed line section of the aircraft engine, the apparatus for introducing oil including an outlet area positioned in the closed line section,
   wherein the closed line section includes a diffusor area upstream of the outlet area where a flow cross-section of the closed line section flares to have an enlarged cross-section in a direction of flow through the closed line section;
   wherein the closed line section includes a confusor area downstream of the outlet area where the flow cross-section of the closed line section tapers to have a reduced cross-section in the direction of flow through the closed line section.

2. The device in accordance with claim 1, wherein the flow cross-section of an intermediate area of the closed line section, which extends between the outlet area and the confusor area, includes a cross-section which is at least one chosen from approximately constant and gradually enlarging to prevent a positive acceleration of the air-oil volume flow.

3. The device in accordance with claim 1, wherein the closed line section further comprises a deflection area adjoining the confusor area downstream of the confusor area, the deflection area including a bend and at least one chosen from a separate oil outlet and a combined air-oil outlet of the closed line section.

4. The device in accordance with claim 1, and further comprising a cyclone connected to the closed line section for receiving oil from the air-oil volume flow.

5. The device in accordance with claim 4, and further comprising an oil separator positioned downstream of the closed line section, the oil separator including an air inlet.

6. The device in accordance with claim 5, wherein the cyclone includes an air inlet and an air outlet and the closed line section includes an air outlet, wherein the air inlet of the cyclone is connected to at least one chosen from the air outlet of the closed line section and an air outlet of an engine area supplied with oil, wherein the air outlet of the cyclone is connected to at least one chosen from the inlet area of the closed line section, the air inlet of the oil separator and an external environment of the aircraft engine.

7. The device in accordance with claim 4, wherein the cyclone includes separate air and oil outlets, where the oil outlet of the cyclone in the installation position of the cyclone is provided in a lower area of the cyclone, while air can be removed from the cyclone via the air outlet from a center area of an interior of the cyclone.

8. The device in accordance with claim 6, wherein an air-oil volume flow introduced into the cyclone via the air inlet is directed tangentially to a wall area of the cyclone.

9. The device in accordance with claim 1, wherein the outlet area is positioned to introduce oil into the closed line section approximately centrally in the closed line section.

10. The device in accordance with claim 1, wherein the outlet area includes a nozzle for introducing the oil into the closed line section formed as at least one chosen from a spray cone and a cone-shaped oil film.

11. The device in accordance with claim 10, wherein an opening angle of the at least one chosen from the spray cone and the cone-shaped oil film is settable such that the oil introduced in conical form impacts in a wall area of the confusor area, the wall area facing the outlet area.

12. The device in accordance with claim 1, wherein the air-oil volume flow is introduced into the closed line section via the inlet area tangentially to the wall area of the closed line section and substantially perpendicular to the introduction direction of the oil from the outlet area.

13. The device in accordance with claim 1, and further comprising a further oil introduction conduit positioned in an area of the closed line section close to a wall area of the closed line section and upstream of the outlet area, to generate in the wall area of the closed line section an oil film and a flow in the oil film in a direction of an oil outlet of the closed line section.

* * * * *